(12) United States Patent
Ducros et al.

(10) Patent No.: US 10,414,890 B2
(45) Date of Patent: Sep. 17, 2019

(54) HYBRID FLUOROPOLYMER COMPOSITES

(71) Applicants: SOLVAY SA, Brussels (BE); COMMISSARIAT A L'ENERGIE ATOMIQUE ET AUX ENERGIES ALTERNATIVES, Paris (FR)

(72) Inventors: Jean-Baptiste Ducros, Fontaine (FR); Aurelie Lavie-Cambot, Martignat (FR); Lionel Picard, Seyssinet-Pariset (FR); Olivier Pras, Saint-Marcellin (FR); Helene Rouault, Le Versoud (FR); Christine Hamon, Bollate (IT); Julio A. Abusleme, Saronno (IT)

(73) Assignees: SOLVAY SA, Brussels (BE); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/028,152

(22) Filed: Jul. 5, 2018

(65) Prior Publication Data
US 2018/0312649 A1    Nov. 1, 2018

Related U.S. Application Data

(62) Division of application No. 15/309,354, filed as application No. PCT/EP2015/059922 on May 6, 2015, now Pat. No. 10,030,112.

(30) Foreign Application Priority Data

May 7, 2014    (EP) .................................... 14305668

(51) Int. Cl.
| | | |
|---|---|---|
| *C08J 5/22* | (2006.01) | |
| *C08G 18/62* | (2006.01) | |
| *H01G 11/56* | (2013.01) | |
| *H01M 10/05* | (2010.01) | |
| *H01G 11/06* | (2013.01) | |
| *C08G 18/71* | (2006.01) | |
| *H01M 10/0525* | (2010.01) | |
| *H01M 10/0565* | (2010.01) | |
| *C08F 214/22* | (2006.01) | |

(52) U.S. Cl.
CPC ........ *C08J 5/2237* (2013.01); *C08G 18/6229* (2013.01); *C08G 18/6279* (2013.01); *C08G 18/718* (2013.01); *H01G 11/06* (2013.01); *H01G 11/56* (2013.01); *H01M 10/0525* (2013.01); *H01M 10/0565* (2013.01); *C08F 214/225* (2013.01); *C08J 2327/22* (2013.01); *H01M 2300/0082* (2013.01); *Y02E 60/13* (2013.01)

(58) Field of Classification Search
CPC . C08J 5/2237; C08J 2327/22; C08G 18/6229; C08G 18/6279; C08G 18/718; H01G 11/56; H01G 11/06; H01M 10/0525; H01M 10/0565; H01M 2300/0082; C08F 214/225
USPC .......................................................... 521/27
See application file for complete search history.

(56) References Cited

U.S. PATENT DOCUMENTS

| | | | | |
|---|---|---|---|---|
| 5,621,042 A | * | 4/1997 | Hanada | C08F 8/42 525/102 |
| 2012/0220712 A1 | * | 8/2012 | Saito | C09D 127/12 524/544 |
| 2013/0184399 A1 | * | 7/2013 | Saito | C08G 18/6275 524/544 |
| 2015/0194271 A1 | * | 7/2015 | Toniolo | C08F 214/18 429/316 |
| 2016/0204405 A1 | * | 7/2016 | Hamon | H01M 2/145 429/144 |

FOREIGN PATENT DOCUMENTS

| | | |
|---|---|---|
| WO | 2011121078 A1 | 10/2011 |
| WO | 2013072216 A1 | 5/2013 |

* cited by examiner

*Primary Examiner* — Michael Bernshteyn

(57) ABSTRACT

The present invention pertains to a fluoropolymer hybrid organic/inorganic composite, to a process for manufacturing said fluoropolymer hybrid organic/inorganic composite and films and membranes thereof and to uses of said fluoropolymer hybrid organic/inorganic composite and films and membranes thereof in various applications.

10 Claims, No Drawings

HYBRID FLUOROPOLYMER COMPOSITES

This application is a divisional application of U.S. application Ser. No. 15/309,354, filed Nov. 7, 2016, which is a U.S. national stage entry under 35 U.S.C. § 371 of International Application No. PCT/EP2015/059922 filed May 6, 2015, which claims priority to European application No. 14305668.7 filed on May 7, 2014. The entire contents of these applications are explicitly incorporated herein by this reference.

TECHNICAL FIELD

The invention pertains to a fluoropolymer hybrid organic/inorganic composite, to a process for manufacturing said fluoropolymer hybrid organic/inorganic composite and films and membranes thereof and to uses of said fluoropolymer hybrid organic/inorganic composite and films and membranes thereof in various applications.

BACKGROUND ART

Fluoropolymers and, in particular, vinylidene fluoride polymers are used in a wide variety of applications including electrochemical applications.

For instance, fluoropolymers are advantageously used as raw materials in the manufacture of polymer membranes suitable for use in electrochemical devices such as secondary batteries because of their chemical and thermal aging resistance.

Alkaline or alkaline-earth secondary batteries are typically formed by assembling a positive electrode (cathode), a ion conducting membrane and a negative electrode (anode). The ion conducting membrane, often referred to as separator, plays a crucial role in the battery as it must provide for a high ionic conductivity while ensuring effective separation between the opposite electrodes.

Basically, two types of separators can be used: either porous ones, wherein a solution of an electrolyte in a suitable solvent fills the porosity of the separator, or non-porous ones, which are generally either pure solid polymer electrolytes (i.e. electrolytes dissolved in a high molecular weight polyether host, like PEO and PPO, which acts as solid solvent) or gelled polymer electrolyte systems, which incorporate into a polymer matrix a plasticizer or solvent capable of forming a stable gel within the polymer host matrix and an electrolyte.

Nevertheless, gelled polymer electrolytes might not incorporate and retain the liquid plasticizer/electrolyte solution in an effective manner during both manufacturing of the battery and operation of the same, and/or might not possess suitable mechanical properties as required for effective separation of the electrodes.

On the other side, hybridization of organic and inorganic compounds is an important and evolutionary way to create polymeric compounds having, notably, enhanced mechanical properties. To elaborate such organic-inorganic polymer hybrids, sol-gel processes using metal alkoxides is the most useful and important approach. By properly controlling the reaction conditions of hydrolysis and condensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds.

Within this scenario, WO 2011/121078 (SOLVAY SOLEXIS S.P.A.) 10 Jun. 2011 discloses certain fluoropolymer-based hybrid organic/inorganic composites wherein covalent bonds connect fluoropolymer chains to the inorganic domains, said composites being obtained by a process involving the reaction of certain functional fluoropolymers having hydroxyl groups with certain hydrolysable compounds of Si, Ti or Zr, and subsequent hydrolysis and polycondensation of said compounds.

This patent document also mentions that the so obtained hybrid organic/inorganic composites can be notably used for the manufacture of membranes for electrochemical applications and more particularly as separators for Lithium ion batteries.

SUMMARY OF INVENTION

The Applicant has now surprisingly found that it is possible to manufacture fluoropolymer hybrid organic/inorganic composites advantageously endowed with outstanding crosslinking density properties which are suitable for use in various applications.

In particular, the Applicant has found that the fluoropolymer hybrid organic/inorganic composite membranes of the present invention successfully exhibit increased electrolyte retention ability, while maintaining good mechanical properties and good ionic conductivity properties, to be suitably used as polymer electrolyte membranes in electrochemical devices.

In a first instance, the present invention pertains to a process for manufacturing a fluoropolymer hybrid organic/inorganic composite [polymer (F-h)], said process comprising:

(i) providing a composition [composition (C1)] comprising:
  at least one fluoropolymer [polymer (F)] comprising recurring units derived from at least one fluorinated monomer [monomer (F)] and at least one hydrogenated monomer comprising at least one hydroxyl group [monomer (OH)],
  at least one metal compound [compound (M1)] of formula (I):

$$X_{4-m}AY_m \quad (I)$$

wherein m is an integer from 1 to 3, A is a metal selected from the group consisting of Si, Ti and Zr, Y is a hydrolysable group and X is a hydrocarbon group comprising at least one —N═C═O functional group,
  a liquid medium [medium (L)] and
  optionally, at least one metal compound [compound (M2)] of formula (II):

$$X'_{4-m'}A'Y'_{m'} \quad (II)$$

wherein m' is an integer from 1 to 4 and, according to certain embodiments, from 1 to 3, A' is a metal selected from the group consisting of Si, Ti and Zr, Y' is a hydrolysable group and X' is a hydrocarbon group, optionally comprising at least one functional group different from the —N═C═O functional group;

(ii) reacting at least a fraction of the hydroxyl groups of the monomer (OH) of said polymer (F) with at least a fraction of said compound (M1) and, optionally, at least a fraction of said compound (M2) thereby providing a composition [composition (C2)] comprising at least one grafted fluoropolymer [polymer (F-g)] comprising recurring units derived from at least one fluorinated monomer [monomer (F)] and at least one hydrogenated monomer [monomer (HH)], said monomer (HH) comprising:
  at least one pendant side chain comprising an end group of formula —O—C(O)—NH—Z-AY$_m$X$_{3-m}$ (M1-g), wherein m, Y, A, X have the same meaning as defined above and Z is a hydrocarbon group, optionally comprising at least one —N=C=O functional group, and optionally, at least one pendant side chain comprising an end group of formula —O-A'Y'$_{m'-1}$X'$_{4-m'}$ (M2-g), wherein m', Y', A', X' have the same meaning as defined above; and (iii) hydrolysing and/or condensing the end groups of formula —O—C(O)—NH—Z-AY$_m$X$_{3-m}$ (M1-g) and, optionally, the end groups of formula —O-A'Y'$_{m'-1}$X'$_{4-m'}$ (M2-g) of the polymer (F-g) thereby providing a composition [composition (C3)] comprising at least one fluoropolymer hybrid organic/inorganic composite [polymer (F-h)].

In a second instance, the present invention pertains to the fluoropolymer hybrid organic/inorganic composite [polymer (F-h)] obtainable by the process of the invention.

In a third instance, the present invention pertains to a fluoropolymer film comprising at least one fluoropolymer hybrid organic/inorganic composite [polymer (F-h)] according to the present invention.

Thus, the invention further pertains to a process for the manufacture of a fluoropolymer film comprising at least one fluoropolymer hybrid organic/inorganic composite [polymer (F-h)], said process comprising:

(i) providing a composition [composition (C1)] comprising:
  at least one fluoropolymer [polymer (F)] comprising recurring units derived from at least one fluorinated monomer [monomer (F)] and at least one hydrogenated monomer comprising at least one hydroxyl group [monomer (OH)],
  at least one metal compound [compound (M1)] of formula (I):

$$X_{4-m}AY_m \qquad (I)$$

wherein m is an integer from 1 to 3, A is a metal selected from the group consisting of Si, Ti and Zr, Y is a hydrolysable group and X is a hydrocarbon group comprising at least one —N=C=O functional group,
  a liquid medium [medium (L)], and
  optionally, at least one metal compound [compound (M2)] of formula (II):

$$X'_{4-m'}A'Y'_{m'} \qquad (II)$$

wherein m' is an integer from 1 to 4 and, according to certain embodiments, from 1 to 3, A' is a metal selected from the group consisting of Si, Ti and Zr, Y' is a hydrolysable group and X' is a hydrocarbon group, optionally comprising at least one functional group different from the —N=C=O functional group;

(ii) reacting at least a fraction of the hydroxyl groups of the monomer (OH) of said polymer (F) with at least a fraction of said compound (M1) and, optionally, at least a fraction of said compound (M2) thereby providing a composition [composition (C2)] comprising at least one grafted fluoropolymer [polymer (F-g)] comprising recurring units derived from at least one fluorinated monomer [monomer (F)] and at least one hydrogenated monomer [monomer (HH)], said monomer (HH) comprising:
  at least one pendant side chain comprising an end group of formula —O—C(O)—NH—Z-AY$_m$X$_{3-m}$ (M1-g), wherein m, Y, A, X have the same meaning as defined above and Z is a hydrocarbon group, optionally comprising at least one —N=C=O functional group, and optionally, at least one pendant side chain comprising an end group of formula —O-A'Y'$_{m'-1}$X'$_{4-m'}$ (M2-g), wherein m', Y', A', X' have the same meaning as defined above;

(iii) hydrolysing and/or condensing the end groups of formula —O—C(O)—NH—Z-AY$_m$X$_{3-m}$ (M1-g) and, optionally, the end groups of formula —O-A'Y'$_{m'-1}$X'$_{4-m'}$ (M2-g) of the polymer (F-g) thereby providing a composition [composition (C3)] comprising at least one fluoropolymer hybrid organic/inorganic composite [polymer (F-h)];

(iv) processing into a film the composition (C3) provided in step (iii); and (v) drying the film provided in step (iv).

For the purpose of the present invention, the term "film" is intended to denote a continuous, generally thin, sheet.

Under step (i) of the process of the invention, the composition (C1) may further comprise an electrolyte medium comprising at least one metal salt [medium (E)].

Thus, in a fourth instance, the present invention pertains to a process for manufacturing a polymer electrolyte membrane, said process comprising:

(i) providing a composition [composition (C1)] comprising:
  at least one fluoropolymer [polymer (F)] comprising recurring units derived from at least one fluorinated monomer [monomer (F)] and at least one hydrogenated monomer comprising at least one hydroxyl group [monomer (OH)],
  at least one metal compound [compound (M1)] of formula (I):

$$X_{4-m}AY_m \qquad (I)$$

wherein m is an integer from 1 to 3, A is a metal selected from the group consisting of Si, Ti and Zr, Y is a hydrolysable group and X is a hydrocarbon group comprising at least one —N=C=O functional group,
  a liquid medium [medium (L)],
  an electrolyte medium comprising at least one metal salt [medium (E)], and
  optionally, at least one metal compound [compound (M2)] of formula (II):

$$X'_{4-m'}A'Y'_{m'} \qquad (II)$$

wherein m' is an integer from 1 to 4 and, according to certain embodiments, from 1 to 3, A' is a metal selected from the group consisting of Si, Ti and Zr, Y' is a hydrolysable group and X' is a hydrocarbon group, optionally comprising at least one functional group different from the —N=C=O functional group;

(ii) reacting at least a fraction of the hydroxyl groups of the monomer (OH) of said polymer (F) with at least a fraction of said compound (M1) and, optionally, at least a fraction of said compound (M2) thereby providing a composition [composition (C2)] comprising at least one grafted fluoropolymer [polymer (F-g)] comprising recurring units derived from at least one fluorinated monomer [monomer (F)] and at least one hydrogenated monomer [monomer (HH)], said monomer (HH) comprising:
  at least one pendant side chain comprising an end group of formula —O—C(O)—NH—Z-AY$_m$X$_{3-m}$ (M1-g), wherein m, Y, A, X have the same meaning as defined above and Z is a hydrocarbon group, optionally comprising at least one —N=C=O functional group, and
  optionally, at least one pendant side chain comprising an end group of formula —O-A'Y'$_{m'-1}$X'$_{4-m'}$ (M2-g), wherein m', Y', A', X' have the same meaning as defined above;

(iii) hydrolysing and/or condensing the pendant groups of formula —O—C(O)—NH—Z-AY$_m$X$_{3-m}$ (M1-g) and, optionally, the pendant groups of formula —O-A' Y'$_{m'-1}$X'$_{4-m'}$ (M2-g) of the polymer (F-g) thereby providing a composition [composition (C3)] comprising at least one fluoropolymer hybrid organic/inorganic composite [polymer (F-h)];

(iv) processing into a polymer electrolyte membrane the composition (C3) provided in step (iii); and (v) drying the polymer electrolyte membrane provided in step (iv).

In a fifth instance, the present invention pertains to the polymer electrolyte membrane obtainable by the process of the invention.

The polymer electrolyte membrane of the invention typically comprises at least one fluoropolymer hybrid organic/inorganic composite [polymer (F-h)] according to the present invention and an electrolyte medium comprising at least one metal salt [medium (E)].

The fluoropolymer hybrid organic/inorganic composite [polymer (F-h)] typically comprises, preferably consists of, fluoropolymer domains and inorganic domains, said polymer (F-h) being obtainable by reacting:

at least one fluoropolymer [polymer (F)] comprising recurring units derived from at least one fluorinated monomer [monomer (F)] and at least one hydrogenated monomer comprising at least one hydroxyl group [monomer (OH)], at least one metal compound [compound (M1)] of formula (I):

$$X_{4-m}AY_m \qquad (I)$$

wherein m is an integer from 1 to 3, A is a metal selected from the group consisting of Si, Ti and Zr, Y is a hydrolysable group and X is a hydrocarbon group comprising at least one —N=C=O functional group, and optionally, at least one metal compound [compound (M2)] of formula (II):

$$X'_{4-m'}A'Y'_{m'} \qquad (II)$$

wherein m' is an integer from 1 to 4 and, according to certain embodiments, from 1 to 3, A' is a metal selected from the group consisting of Si, Ti and Zr, Y' is a hydrolysable group and X' is a hydrocarbon group, optionally comprising at least one functional group different from the —N=C=O functional group, in the presence of a liquid medium [medium (L)] and, optionally, an electrolyte medium comprising at least one metal salt [medium (E)], thereby providing at least one grafted fluoropolymer [polymer (F-g)] comprising recurring units derived from at least one fluorinated monomer [monomer (F)] and at least one hydrogenated monomer [monomer (HH)], said monomer (HH) comprising:

at least one pendant side chain comprising an end group of formula —O—C(O)—NH—Z-AY$_m$X$_{3-m}$ (M1-g), wherein m, Y, A, X have the same meaning as defined above and Z is a hydrocarbon group, optionally comprising at least one —N=C=O functional group, and optionally, at least one pendant side chain comprising an end group of formula —O-A'Y'$_{m'-1}$X'$_{4-m'}$ (M2-g), wherein m', Y', A', X' have the same meaning as defined above, wherein the inorganic domains are obtainable by hydrolysing and/or condensing the end groups of formula —O—C(O)—NH—Z-AY$_m$X$_{3-m}$ (M1-g) and, optionally, the end groups of formula —O-A'Y'$_{m'-1}$X'$_{4-m'}$ (M2-g) of the polymer (F-g).

For the purpose of the present invention, the term "membrane" is intended to denote a discrete, generally thin, interface which moderates permeation of chemical species in contact with it.

In a sixth instance, the present invention pertains to an electrochemical device comprising the polymer electrolyte membrane of the invention.

Non-limitative examples of suitable electrochemical devices include, notably, secondary batteries, especially, alkaline or an alkaline-earth secondary batteries such as Lithium ion batteries, and capacitors, especially Lithium ion capacitors.

The polymer electrolyte membrane of the present invention is advantageously endowed with outstanding crosslinking density properties and thus successfully exhibits outstanding mechanical properties to be suitably used as a free standing polymer electrolyte membrane.

Determination of the crosslinking density of the fluoropolymer hybrid organic/inorganic composite of the present invention can be performed by any suitable method. The fluoropolymer hybrid organic/inorganic composite is typically swelled in a suitable solvent at a specific temperature and either the change in mass or the change in volume is measured.

It has been surprisingly found that the free standing polymer electrolyte membrane of the present invention can stably comprise and retain high fractions of electrolytes while maintaining outstanding mechanical properties and excellent ionic conductivity properties.

It has been also surprisingly found that the free standing polymer electrolyte membrane can be advantageously dried and re-wetted with other electrolytes without impairing its ionic conductivity properties.

The polymer (F) is typically obtainable by polymerization of at least one monomer (F) and at least one monomer (OH).

The polymer (F) may further comprise recurring units derived from at least one hydrogenated monomer [monomer (H)] different from the monomer (OH).

Should the polymer (F) further comprise recurring units derived from at least one hydrogenated monomer [monomer (H)] different from the monomer (OH), it is typically obtainable by polymerization of at least one monomer (F), at least one monomer (OH) and at least one monomer (H) different from said monomer (OH).

By the term "fluorinated monomer [monomer (F)]" it is hereby intended to denote an ethylenically unsaturated monomer comprising at least one fluorine atom.

By the term "hydrogenated monomer [monomer (H)]" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) comprises preferably at least 0.01% by moles, more preferably at least 0.05% by moles, even more preferably at least 0.1% by moles of recurring units derived from at least one monomer (OH) as defined above.

The polymer (F) comprises preferably at most 20% by moles, more preferably at most 15% by moles, even more preferably at most 10% by moles, most preferably at most 3% by moles of recurring units derived from at least one monomer (OH) as defined above.

Determination of average mole percentage of monomer (OH) recurring units in polymer (F) can be performed by any suitable method. Mention can be notably made of acid-base titration methods, well suited e.g. for the determination of the acrylic acid content, of NMR methods, adequate for the quantification of monomers (OH) comprising aliphatic hydrogen atoms in side chains, of weight balance based on total fed monomer (OH) and unreacted residual monomer (OH) during polymer (F) manufacture.

The monomer (OH) is typically selected from the group consisting of (meth)acrylic monomers of formula (III) and vinylether monomers of formula (IV):

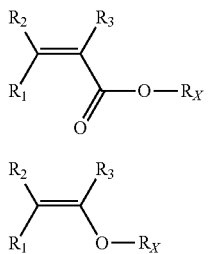

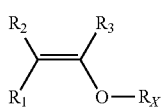

wherein each of $R_1$, $R_2$ and $R_3$, equal to or different from each other, is independently a hydrogen atom or a $C_1$-$C_3$ hydrocarbon group, and Rx is a $C_1$-$C_5$ hydrocarbon moiety comprising at least one hydroxyl group.

The monomer (OH) is preferably of formula (III) as defined above.

The monomer (OH) is more preferably of formula (III-A):

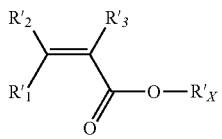

wherein $R'_1$, $R'_2$ and $R'_3$ are hydrogen atoms and $R'_X$ is a $C_1$-$C_5$ hydrocarbon moiety comprising at least one hydroxyl group.

Non limitative examples of monomers (OH) include, notably, hydroxyethyl(meth)acrylate, hydroxypropyl(meth)acrylate, hydroxyethylhexyl(meth)acrylate.

The monomer (OH) is even more preferably selected from the followings:

hydroxyethyl acrylate (HEA) of formula:

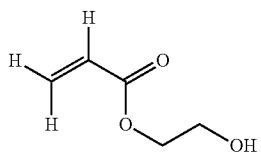

2-hydroxypropyl acrylate (HPA) of either of formulae:

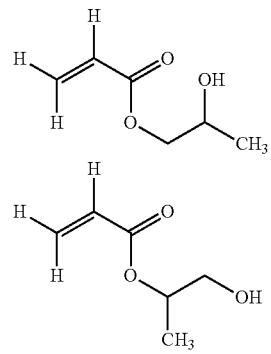

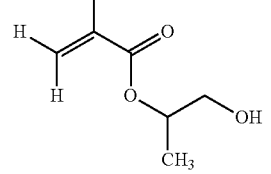

and mixtures thereof.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

Non limitative examples of suitable monomers (F) include, notably, the followings:

$C_2$-$C_8$ perfluoroolefins, such as tetrafluoroethylene and hexafluoropropylene;

$C_2$-$C_8$ hydrogenated fluoroolefins, such as vinylidene fluoride, vinyl fluoride, 1,2-difluoroethylene and trifluoroethylene;

perfluoroalkylethylenes of formula $CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins, such as chlorotrifluoroethylene;

(per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups, such as $-C_2F_{5-0}-CF_3$;

functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

Non limitative examples of suitable monomers (H) include, notably, ethylene, propylene and isobutylene, and styrene monomers such as styrene and p-methylstyrene.

The polymer (F) comprises preferably more than 25% by moles, preferably more than 30% by moles of recurring units derived from at least one monomer (F).

The polymer (F) comprises preferably more than 1% by moles, preferably more than 5% by moles, more preferably more than 10% by moles of recurring units derived from at least one monomer (H) different from the monomer (OH).

The monomer (F) can further comprise one or more other halogen atoms (Cl, Br, I). Should the fluorinated monomer be free of hydrogen atoms, it is designated as per(halo) fluoromonomer.

Should the monomer (F) comprise at least one hydrogen atom, it is designated as hydrogen-containing fluorinated monomer.

Should the monomer (F) be a hydrogen-containing fluorinated monomer, such as for instance vinylidene fluoride, trifluoroethylene, vinyl fluoride, the polymer (F) is either a polymer comprising recurring units derived from said hydrogen-containing fluorinated monomer and at least one monomer (OH) as defined above, or it is a polymer comprising recurring units derived from said hydrogen-containing fluorinated monomer, at least one monomer (OH) as defined above and at least one other monomer.

Should the monomer (F) be a per(halo)fluoromonomer, such as for instance tetrafluoroethylene, chlorotrifluoroethylene, hexafluoropropylene, perfluoroalkylvinylethers, the polymer (F) is a polymer comprising recurring units derived from said per(halo)fluoromonomer, at least one monomer (OH) as defined above and at least one monomer (H) different from the monomer (OH).

Preferred polymers (F) are those comprising one or more backbone chains, said backbone chains comprising recurring units derived from at least one monomer (F) selected from the group consisting of vinylidene fluoride (VDF), tetrafluoroethylene (TFE) and chlorotrifluoroethylene (CTFE).

The polymer (F) is more preferably selected from the group consisting of:
- polymers (F-1) comprising recurring units derived from vinylidene fluoride (VDF), at least one monomer (OH) as defined above and, optionally, at least one monomer (F) different from VDF, and
- polymers (F-2) comprising recurring units derived from at least one per(halo)fluoromonomer selected from tetrafluoroethylene (TFE) and chlorotrifluoroethylene (CTFE), at least one monomer (H) selected from ethylene, propylene and isobutylene, and at least one monomer (OH) as defined above, optionally comprising one or more additional monomers, typically in amounts of from 0.01% to 30% by moles, based on the total amount of TFE and/or CTFE and said monomer (H).

The polymer (F-1) preferably comprises:
(a) at least 60% by moles, preferably at least 75% by moles, more preferably at least 85% by moles of vinylidene fluoride (VDF);
(b) optionally, from 0.1% to 15% by moles, preferably from 0.1% to 12% by moles, more preferably from 0.1% to 10% by moles of at least one monomer (F) selected from vinyl fluoride ($VF_1$), chlorotrifluoroethylene (CTFE), hexafluoropropylene (HFP), tetrafluoroethylene (TFE), trifluoroethylene (TrFE), perfluoromethylvinylether (PMVE); and
(c) from 0.01% to 20% by moles, preferably from 0.05% to 18% by moles, more preferably from 0.1% to 10% by moles of at least one monomer (OH) of formula (III) as defined above.

In polymers (F-2) as defined above, the molar ratio per(halo)fluoromonomer(s)/monomer(s) (H) is typically of from 30:70 to 70:30. In polymers (F-2) as defined above, the monomer (H) is preferably ethylene, optionally in combination with other monomers (H).

Polymers (F-2) wherein the per(halo)fluoromonomer is predominantly chlorotrifluoroethylene (CTFE) will be identified herein below as ECTFE copolymers; polymers (F-2) wherein the per(halo)fluoromonomer is predominantly tetrafluoroethylene (TFE) will be identified herein below as ETFE copolymers.

The polymer (F-2) preferably comprises:
(a') from 35% to 65% by moles, preferably from 45% to 55% by moles, more preferably from 48% to 52% by moles of at least one per(halo)fluoromonomer selected from the group consisting of chlorotrifluoroethylene (CTFE) and tetrafluoroethylene (TFE);
(b') from 35% to 65% by moles, preferably from 45% to 55% by moles, more preferably from 48% to 52% by moles of ethylene (E); and
(c') from 0.01% to 20% by moles, preferably from 0.05% to 18% by moles, more preferably from 0.1% to 10% by moles of at least one monomer (OH) of formula (III) as defined above.

Among polymers (F-2), ECTFE polymers are preferred.

The polymer (F) is even more preferably selected from polymers (F-1) as defined above.

The polymer (F) is typically obtainable by emulsion polymerization or suspension polymerization.

The selection of the hydrolysable group Y of the compound (M1) of formula (I) as defined above is not particularly limited provided that it enables under appropriate conditions the formation of a —O-AE bond. The hydrolysable group Y is typically selected from the group consisting of halogen atoms, preferably being a chlorine atom, hydrocarboxy groups, acyloxy groups and hydroxyl groups.

The compound (M1) is preferably of formula (I-A):

$$R^A_{4-m}A(OR^B)_m \qquad (I-A)$$

wherein m is an integer from 1 to 3, A is a metal selected from the group consisting of Si, Ti and Zr, $R^A$, equal to or different from each other and at each occurrence, is a $C_1$-$C_{12}$ hydrocarbon group comprising at least one —N=C=O functional group and $R^B$, equal to or different from each other and at each occurrence, is a $C_1$-$C_5$ linear or branched alkyl group, preferably $R^B$ being a methyl or ethyl group.

The compound (M1) is preferably of formula (I-B):

$$O=C=N-R^{A'}-A-(OR^{B'})_3 \qquad (I-B)$$

wherein A is a metal selected from the group consisting of Si, Ti and Zr, $R^{A'}$, equal to or different from each other and at each occurrence, is a linear or branched $C_1$-$C_{12}$ hydrocarbon group and $R^{B'}$, equal to or different from each other and at each occurrence, is a $C_1$-$C_5$ linear or branched alkyl group, preferably $R^B$ being a methyl or ethyl group.

Non-limitative examples of suitable compounds (M1) include the followings: trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

The selection of the hydrolysable group Y' of the compound (M2) of formula (II) as defined above is not particularly limited provided that it enables under appropriate conditions the formation of a —O-A≡ bond. The hydrolysable group Y' is typically selected from the group consisting of halogen atoms, preferably being a chlorine atom, hydrocarboxy groups, acyloxy groups and hydroxyl groups.

In case the compound (M2) of formula (II) as defined above comprises at least one functional group different from the —N=C=O functional group on group X', it will be designated as functional compound (M2); in case none of groups X' comprise a functional group different from the —N═C═O functional group, the compound (M2) of formula (II) as defined above will be designated as non-functional compound (M2).

Mixtures of one or more functional compounds (M2) and one or more non-functional compounds (M2) may be used in the process of the invention.

Functional compounds (M2) can advantageously further modify the chemistry and the properties of the polymer (F-g) over native polymer (F) and native inorganic phase.

The compound (M2) is preferably of formula (II-A):

$$R^C_{4-m'}A(OR^D)_{m'} \quad (II-A)$$

wherein m' is an integer from 1 to 4, and, according to certain embodiments, from 1 to 3, A is a metal selected from the group consisting of Si, Ti and Zr, $R^C$ and $R^D$, equal to or different from each other and at each occurrence, are independently selected from $C_1$-$C_{18}$ hydrocarbon groups, wherein $R^C$ optionally comprises at least one functional group different from the —N═C═O functional group.

Non limitative examples of functional groups different from the —N═C═O functional group include, notably, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M2) be a functional compound (M2), it is more preferably of formula (II-B):

$$R^{C'}_{4-m''}A(OR^{D'})_{m''} \quad (II-B)$$

wherein m" is an integer from 1 to 3, A is a metal selected from the group consisting of Si, Ti and Zr, $R^{C'}$, equal to or different from each other and at each occurrence, is a $C1$-$C_{12}$ hydrocarbon group comprising at least one functional group different from the —N═C═O functional group and $R^{D'}$, equal to or different from each other and at each occurrence, is a $C_1$-$C_5$ linear or branched alkyl group, preferably $R^{D'}$ being a methyl or ethyl group.

Examples of functional compounds (M2) are notably vinyltriethoxysilane, vinyltrimethoxysilane, vinyltrismethoxyethoxysilane of formula CH$_2$═CHSi(OC$_2$H$_4$OCH$_3$)$_3$, 2-(3,4-epoxycyclohexylethyltrimethoxysilane) of formula:

glycidoxypropylmethyldiethoxysilane of formula:

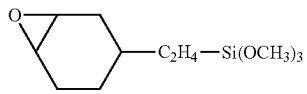

glycidoxypropyltrimethoxysilane of formula:

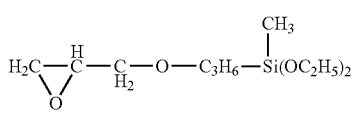

methacryloxypropyltrimethoxysilane of formula:

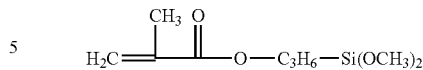

aminoethylaminpropylmethyldimethoxysilane of formula:

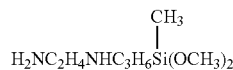

aminoethylaminpropyltrimethoxysilane of formula:

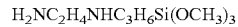

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

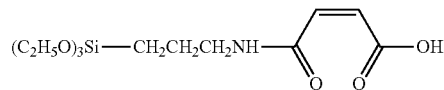

3-(trihydroxysilyI)-1-propane-sulphonic acid of formula HOSO$_2$—CH$_2$CH$_2$CH$_2$—Si(OH)$_3$, N-(trimethoxysilylpropyl)ethylene-diamine triacetic acid, and its sodium salts, 3-(triethoxysilyl)propylsuccinic anhydride of formula:

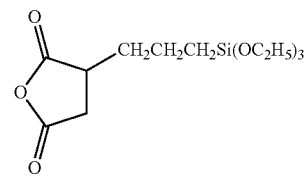

acetamidopropyltrimethoxysilane of formula H$_3$C—C(O)NH—CH$_2$CH$_2$CH$_2$—Si(OCH$_3$)$_3$, alkanolamine titanates of formula Ti(L)$_X$(OR)$_y$, wherein L is an amine-substituted alkoxy group, e.g. OCH$_2$CH$_2$NH$_2$, R is an alkyl group, and x and y are integers such that x+y=4.

Examples of non-functional compounds (M2) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Under step (i) of the process of the invention, the composition (C1) is typically obtainable by adding at least one compound (M1) of formula (I) and, optionally, at least one compound (M2) of formula (II) to a composition comprising at least one polymer (F) and a medium (L).

Under step (i) of the process of the invention, the composition (C1) typically comprises at least one compound (M1) of formula (I) in an amount comprised between 0.1% and 95% by weight, preferably between 1% and 75% by weight, more preferably between 5% and 55% by weight, based on the total weight of the polymer (F), the compound (M1) and, optionally, the compound (M2).

For the purpose of the present invention, by the term "liquid medium [medium (M)]" it is hereby intended to denote a composition comprising one or more substances in the liquid state at 20° C. under atmospheric pressure.

The medium (L) typically comprises at least one organic solvent [solvent (S)].

The choice of the solvent (S) is not particularly limited provided that it is suitable for solubilising the polymer (F).

Non-limitative examples of suitable solvents (S) include, notably, the followings:
- aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran,
- glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
- glycol ether esters such as ethylene glycol methyl ether acetate, ethylene glycol monoethyl ether acetate, ethylene glycol monobutyl ether acetate,
- alcohols such as methyl alcohol, ethyl alcohol, diacetone alcohol,
- ketones such as acetone, methylethylketone, methylisobutyl ketone, diisobutylketone, cyclohexanone, isophorone, and
- linear or cyclic esters such as isopropyl acetate, n-butyl acetate, methyl acetoacetate, dimethyl phthalate, g-butyrolactone;
- linear or cyclic amides such as N,N-diethylacetamide, N,N-dimethylacetamide, N,N-dimethylformamide and N-methyl-2-pyrrolidone; and
- dimethyl sulfoxide.

Under step (i) of the process of the invention, the composition (C1) may further comprise at least one inorganic filler [filler (I)].

The choice of the filler (I) is not particularly limited.

The filler (I) is typically provided in the form of solid particles.

The filler (I) particles generally have an average particle size of from 0.001 µm to 200 µm, preferably of from 0.01 µm to 50 µm, more preferably of from 0.03 µm to 10 µm.

Under step (i) of the process of the invention, the composition typically comprises at least one filler (I) different from the either the compound (M1) or the compound (M2) in an amount of from 60% to 95% by weight, more preferably of from 65% to 90% by weight, with respect to the total weight of the polymer (F) and the filler (I).

Among fillers (I) suitable for being used in the process of the invention, mention can be made of inorganic oxides, including mixed oxides, metal sulphates, metal carbonates, metal sulphides and the like.

A class of compounds which gave particularly good results within the context of the present invention are notably silicates, aluminium-silicates and magnesium silicates, all optionally containing additional metals such as sodium, potassium, iron or lithium.

These silicates, aluminium-silicates and magnesium silicates, all optionally containing additional metals such as sodium, potassium, iron or lithium, can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium, can be selected among synthetic clays, like notably fluorohectorite, hectorite, laponite.

The filler (I) may be also selected from ion-conducting inorganic filler materials.

For the purpose of the present invention, by the term "ion-conducting" it is hereby intended to denote a material allowing electrolyte ions to flow there through.

Non-limitative examples of suitable ion-conducting inorganic filler materials include, notably, lithium ceramics such as $LiTaO_3$—$SrTiO_3$, $LiTi_2(PO_4)_3$—$Li_2O$ and $Li_4SiO_4$—$Li_3PO_4$.

Also, fillers (I) having on their surface reactive groups towards the compound (M1) can be used in the process of the invention.

Among surface reactive groups, mention is notably made of hydroxyl groups.

Without being bound by this theory, the Applicant believes that reaction between at least a fraction of the hydrolysable group(s) Y of the compound (M1) with at least a fraction of said surface reactive groups of the filler (I) can occur simultaneously with the reaction of at least a fraction of the hydrolysable group(s) Y of the compound (M1) with at least a fraction of the hydroxyl groups of the polymer (F) so that, in subsequent hydrolysis and/or condensation, chemical bonding between the polymer (F) and the filler (I) is likely achieved through the inorganic domains derived from the compound (M1).

The filler (I) is preferably selected among inorganic oxides.

Non-limitative examples of suitable inorganic oxides include, notably, $SiO_2$, $TiO_2$, $ZnO$, $Al_2O_3$.

Under step (ii) of the process of the invention, the polymer (F), the compound (M1) of formula (I) and, optionally, the compound (M2) of formula (II) are reacted at temperatures typically comprised between 20° C. and 100° C. Temperatures between 20° C. and 90° C., preferably between 20° C. and 50° C. will be preferred.

The skilled in the art will properly select the temperature depending on the boiling point of the medium (L).

Under step (i) of the process of the invention, the composition (C1) advantageously further comprises at least one condensation catalyst.

The condensation catalyst is preferably selected from the group consisting of organic tin compounds.

Under step (i) of the process of the invention, the condensation catalyst is typically added to the composition (C1) in an amount comprised between 0.1% and 50% by moles, preferably between 1% and 25% by moles, more preferably between 5% and 15% by moles, based on the total amount by moles of compound (M1) and, optionally, compound (M2).

Non-limitative examples of organic tin compounds suitable as condensation catalysts in the process of the invention include, notably, dibutyltin dilaurate, dibutyltin oxide, tributyltin oxide, dioctyltin oxide, methyltin mercaptide, tributyltin chloride and tributyltin fluoride.

The hydrolysis and/or condensation is usually carried out at room temperature or upon heating at a temperature lower than 100° C. The temperature will be selected having regards to the boiling point of the medium (L). Temperatures between 20° C. and 90° C., preferably between 20° C. and 50° C. will be preferred.

It is understood that, while the hydrolysis and/or condensation reaction may be initiated during step (ii) of the process of the invention, said reaction may be continued during any one of steps (iv) or (v) of the process of the invention.

As this will be recognized by the skilled in the art, the hydrolysis and/or condensation usually generates low molecular weight side products, which can be notably water or alcohols, as a function of the nature of the compound (M1) and, optionally, of the compound (M2).

Under step (iii) of the process of the invention, the composition (C3) typically comprises:
at least one fluoropolymer hybrid organic/inorganic composite [polymer (F-h)] and
a liquid medium [medium (L)].

An acid catalyst is typically added to the composition of any one of steps (i) to (iii) of the process of the invention.

The selection of the acid catalyst is not particularly limited. The acid catalyst is typically selected from the group consisting of organic and inorganic acids.

The acid catalyst is typically added to the composition of any one of steps (i) to (iii) of the process of the invention in an amount comprised between 0.5% and 10% by weight, preferably between 1% and 5% by weight, based on the total weight of the composition.

The acid catalyst is preferably selected from the group consisting of organic acids.

Very good results have been obtained with formic acid.

Under step (iv) of the process of the invention, the composition (C3) provided in step (iii) is processed into a film or a polymer electrolyte membrane typically using techniques commonly known in the art.

Non-limitative examples of suitable techniques include casting, doctor blade coating, metering rod (or Meyer rod) coating, slot die coating, knife over roll coating or "gap" coating, and the like.

Under step (v) of the process of the invention, the film or the polymer electrolyte membrane provided in step (iv) is dried at a temperature typically comprised between 25° C. and 200° C.

Drying can be performed either under atmospheric pressure or under vacuum. Alternatively, drying can be performed under modified atmosphere, e.g. under an inert gas, typically exempt notably from moisture (water vapour content of less than 0.001% v/v).

The drying temperature will be selected so as to effect removal by evaporation of the medium (L) from the film or the polymer electrolyte membrane provided in step (iv) of the process of the invention.

Curing, if any, is carried out at a temperature typically comprised between 100° C. and 250° C., preferably between 120° C. and 200° C.

It is understood that, under step (v) of the process of the invention, the medium (L), further comprising the low molecular weight side products generated by hydrolysis and/or condensation, which can be notably water or alcohols, as a function of the nature of the compound (M1) and, optionally, of the compound (M2), are at least partially removed from the film or the polymer electrolyte membrane provided in step (iv) of the process of the invention, possibly further promoting, by combined action of heat and side products removal, additional hydrolysis and/or condensation.

The film or the polymer electrolyte membrane provided in step (v) of the process of the invention may be further submitted to a post-treatment step, preferably may be further submitted to compression, typically at a temperature comprised between 50° C. and 300° C.

The skilled in the art will select the temperature of step (v) of the process of the invention and of any subsequent post-treatment step having regards, inter alia, of the melting point of the polymer (F).

The medium (E) is typically a liquid medium comprising at least one metal salt.

The medium (E) is typically different from the medium (L).

The medium (E) is typically free from one or more solvents (S).

The choice of the liquid medium of the medium (E) is not particularly limited provided that it is suitable for solubilising the metal salt.

The metal salt is typically selected from the group consisting of MeI, $Me(PF_6)_n$, $Me(BF_4)_n$, $Me(ClO_4)_n$, Me(bis(oxalato)borate)$_n$ ("Me(BOB)$_n$"), $MeCF_3SO_3$, $Me[N(CF_3SO_2)_2]_n$, $Me[N(C_2F_5SO_2)_2]_n$, $Me[N(CF_3SO_2)(RFSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

The metal salt is preferably selected from the group consisting of LiI, $LiPF_6$, $LiBF_4$, $LiClO_4$, lithium bis(oxalato)borate ("LiBOB"), $LiCF_3SO_3$, $LiN(CF_3SO_2)_2$, $LiN(C_2F_5SO_2)_2$, $M[N(CF_3SO_2)(RFSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The amount of the medium (E) in the composition (C1) is typically at least 40% by weight, preferably at least 50% by weight, more preferably at least 60% by weight, based on the total weight of said medium (E) and the polymer (F).

Very good results have been obtained using a composition (C1) comprising at least 50% by weight of the medium (E), based on the total weight of said medium (E) and the polymer (F).

The concentration of the metal salt in the medium (E) is advantageously at least 0.01 M, preferably at least 0.025 M, more preferably at least 0.05 M.

The concentration of the metal salt in the medium (E) is advantageously at most 1 M, preferably at most 0.75 M, more preferably at most 0.5 M.

According to a first embodiment of the invention, the medium (E) comprises at least one metal salt and at least one organic carbonate.

Non-limitative examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

According to a second embodiment of the invention, the medium (E) comprises at least one metal salt, at least one ionic liquid and, optionally, at least one organic carbonate.

For the purpose of the present invention, the term "ionic liquid" is intended to denote a compound formed by the combination of a positively charged cation and a negatively charged anion in the liquid state at temperatures below 100° C. under atmospheric pressure.

The ionic liquid typically contains:
a positively charged cation selected from the group consisting of imidazolium, pyridinium, pyrrolidinium and piperidinium ions optionally containing one or more $C_1$-$C_{30}$ alkyl groups, and
a negatively charged anion selected from the group consisting of halides, perfluorinated anions and borates.

Non-limitative examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

The positively charged cation of the ionic liquid is preferably selected from the group consisting of:
a pyrrolidinium cation of formula (V):

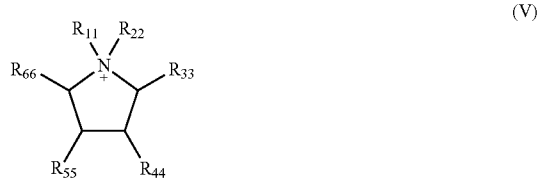

(V)

wherein $R_{11}$ and $R_{22}$, equal to or different from each other, independently represent a $C_1$-$C_8$ alkyl group and $R_{33}$, $R_{44}$, $R_{55}$ and $R_{66}$, equal to or different from each other, independently represent a hydrogen atom or a $C_1$-$C_{30}$ alkyl group, preferably a $C_1$-$C_{18}$ alkyl group, more preferably a $C_1$-$C_5$ alkyl group, and a piperidinium cation of formula (VI):

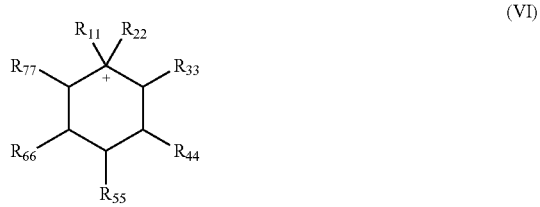

(VI)

wherein $R_{11}$ and $R_{22}$, equal to or different from each other, independently represent a $C_1$-$C_8$ alkyl group and $R_{33}$, $R_{44}$, $R_{55}$, $R_{66}$ and $R_{77}$, equal to or different from each other, independently represent a hydrogen atom or a $C_1$-$C_{30}$ alkyl group, preferably a $C_1$-$C_{18}$ alkyl group, more preferably a $C_1$-$C_5$ alkyl group.

The positively charged cation of the ionic liquid is more preferably selected from the group consisting of:
a pyrrolidinium cation of formula (V-A):

(V-A)

a piperidinium cation of formula (VI-A):

(VI-A)

The negatively charged anion of the ionic liquid is preferably selected from the group consisting of:
bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

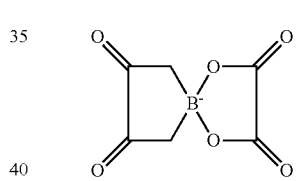

The ionic liquid even more preferably contains a pyrrolidinium cation of formula (V-A) as defined above and a perfluorinated anion selected from the group consisting of bis(trifluoromethylsulphonyl)imide of formula $(SO_2CF_3)_2N^-$, hexafluorophosphate of formula $PF_6^-$ and tetrafluoroborate of formula $BF_4^-$.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials
Polymer (F-1): VDF-HEA (1% by moles)-HFP (2.3% by moles) having a Melt Flow Index (MFI) of 15 g/min (2.16 Kg, 230° C.).
Polymer (F-2): VDF-HEA (1% by moles) having a MFI of 15 g/min (2.16 Kg, 230° C.).
TSPI: 3-(triethoxysilyl)propyl isocyanate
DBTDL: dibutyltin dilaurate
LiTFSI: bis(trifluoromethanesulfonyl)imide lithium salt
TEOS: $Si(OC_2H_5)_4$ PYR13TFSI: N-Propyl-N-methylpyrrolidinium bis(trifluoromethanesulfonyl)imide Dissolution Test The membrane (5-10 mg) was placed in about 5 mL of N,N-dimethylformamide (DMF) for about 1 minute at room temperature. DMF is a good solvent for polymer (F). The more crosslinking density of the membrane, the more swelling and less dissolution of the membrane in DMF is attainable.

Determination of Ionic Conductivity

The membrane was put between two stainless steel electrodes and sealed in a container.

The resistance of the membrane was measured and the ionic conductivity ($\sigma$) was calculated using the following equation:

$$\text{Ionic conductivity } (\sigma) = d/(R_b \times S)$$

wherein d is the thickness [cm] of the film, $R_b$ is the bulk resistance [$\Omega$] and S is the area [cm$^2$] of the stainless steel electrode.

EXAMPLE 1—MANUFACTURE OF A FLUOROPOLYMER FILM

Example 1-A: Preparation of the Solution

The polymer (F-1) (1.5 g) was dissolved in 8.5 g of acetone at 60° C. thereby providing a solution containing 15% by weight of the polymer (F-1). The solution was homogeneous and transparent after homogenization at room temperature and then at 60° C. Then, DBTDL (0.015 g) and TSPI (0.060 g) were added to the solution. The quantity of DBTDL was calculated to be 10% by moles vs. TSPI. TSPI itself was calculated to be 1.1% by moles vs. the polymer (F-1). Once again, the solution was homogenized at 60° C. and then it was left at 60° C. for about 90 min so as to let isocyanate functional groups of TSPI to react with the hydroxyl groups of the polymer (F-1). The solution was then brought to room temperature.

Once again, the solution was homogenized at 60° C. and then brought to room temperature.

Example 1-B: Casting of the Solution

The solution was spread with a constant thickness onto a PET film substrate using a tape casting machine (doctor blade). The thickness was controlled by setting a distance of 150 μm between the knife and the PET film.

After evaporation of the solvents from the solution, a film was obtained.

After a few hours, the film was detached from the PET substrate.

The film had a constant thickness, comprised between 10 μm and 60 μm, depending on its composition.

The film thereby provided was advantageously swollen but not dissolved in DMF.

EXAMPLE 2—MANUFACTURE OF A FLUOROPOLYMER FILM

The same procedure under Example 1 was followed but, after homogenization at 60° C., formic acid was added to the solution of Example 1-A. The solution so obtained was homogenized at 60° C. and then brought to room temperature. TEOS was added thereto and the solution thereby provided was held at 60° C. for 30 min. The solution was then brought to room temperature.

The quantity of TEOS was calculated from the weight ratio ($m_{SiO2}/m_{polymer\ (F-1)}$) assuming total conversion of TEOS into $SiO_2$.

The quantity of formic acid was calculated from the following equation:

$$n_{formic\ acid}/n_{TEOS} = 7.8$$

The film thereby provided contained 10% by weight of $SiO_2$ deriving from TEOS.

The film was advantageously swollen but not dissolved in DMF.

COMPARATIVE EXAMPLE 1

A film was manufactured following the same procedure under Example 1-B but using a solution containing only 15% by weight of the polymer (F-1) in acetone.

The film was dissolved in DMF.

COMPARATIVE EXAMPLE 2

A film was manufactured following the same procedure under Example 1-B but using a solution containing 15% by weight of the polymer (F-1) in acetone to which, after homogenization at 60° C., formic acid was added. The solution so obtained was homogenized at 60° C. and then brought to room temperature. TEOS was added thereto and the solution thereby provided was held at 60° C. for 30 min. The solution was then brought to room temperature.

The film thereby provided contained 10% by weight of $SiO_2$ deriving from TEOS.

The film was dissolved in DMF.

EXAMPLE 3—MANUFACTURE OF A POLYMER ELECTROLYTE MEMBRANE

A polymer electrolyte membrane was manufactured by using the solution of Example 1-A to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added. The membrane thereby provided contained 5% by weight of $SiO_2$ deriving from TEOS.

The weight ratio [$m_{electrolyte}/(m_{electrolyte}+m_{polymer\ (F-1)})$] was 50%.

The membrane thereby provided was advantageously swollen but not dissolved in DMF.

EXAMPLE 4—MANUFACTURE OF A POLYMER ELECTROLYTE MEMBRANE

A polymer electrolyte membrane was manufactured by using the solution of Example 2 to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added.

The weight ratio [$m_{electrolyte}/(m_{electrolyte}+m_{polymer\ (F-1)})$] was 50%.

The membrane thereby provided contained 5% by weight of $SiO_2$ deriving from TEOS.

The membrane thereby provided was advantageously swollen but not dissolved in DMF.

EXAMPLE 5—MANUFACTURE OF A POLYMER ELECTROLYTE MEMBRANE

A polymer electrolyte membrane was manufactured by using the solution of Example 2 to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-1)})]$ was 50%.

The membrane thereby provided contained 20% by weight of $SiO_2$ deriving from TEOS.

The membrane thereby provided was advantageously swollen but not dissolved in DMF.

EXAMPLE 6—MANUFACTURE OF A POLYMER ELECTROLYTE MEMBRANE

A polymer electrolyte membrane was manufactured by using the solution of Example 1-A, further containing (Zr($O_nPr)_4$, to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-1)})]$ was 50%.

The membrane thereby provided contained 10% by weight of $ZrO_2$ deriving from Zr($O_nPr)_4$.

The membrane thereby provided was advantageously swollen but not dissolved in DMF.

EXAMPLE 7—MANUFACTURE OF A POLYMER ELECTROLYTE MEMBRANE

A polymer electrolyte membrane was manufactured by using the solution of Example 2 to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-1)})]$ was 66%.

The membrane thereby provided contained 20% by weight of $SiO_2$ deriving from TEOS.

The membrane thereby provided was advantageously swollen but not dissolved in DMF.

Ionic conductivity: 0.13 mS/cm

EXAMPLE 8—INTEGRITY OF THE POLYMER ELECTROLYTE MEMBRANE

The polymer electrolyte membrane of Example 5 was dried and re-wetted with the same electrolyte. The same amount of electrolyte was impregnated in the re-wetted membrane.

The membrane thereby provided exhibits good mechanical integrity and good flexibility properties in absorbing and desorbing the electrolyte.

EXAMPLE 9—MANUFACTURE OF A POLYMER ELECTROLYTE MEMBRANE

A polymer electrolyte membrane was manufactured by using the solution of Example 2 to which an electrolyte medium was added, said electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added.

The weight ratio $[m_{electrolyte}/(m_{electrolyte}+m_{polymer\ (F-1)})]$ was 66%.

The membrane thereby provided was advantageously swollen but not dissolved in DMF.

Ionic conductivity: 0.8 mS/cm

The polymer electrolyte membrane of Example 9 was tested in the following battery: anode/polymer electrolyte membrane/cathode.

Cathode:
91.5% $LiFePO_4$/2% C-NERGY® SUPER C65 carbon black/2% VGCF® carbon fiber/4.5% SOLEF® 5130 PVDF (loading: 3.7 mAh/cm$^2$).

Anode:
96% TIMREX® SLP 30 graphite/2% CMC (carboxymethylcellulose)/2% SBR (Styrene Butadiene Rubber) (loading: 4.3 mAh/cm$^2$).

Manufacture of the Battery

The polymer electrolyte membrane was treated at 70° C. for 30 min. Both the electrodes were dried for 48 hours under vacuum at 80° C. The electrodes and the membrane were put in an argon environment. Both the electrodes were immersed into an electrolyte medium consisting of a mixture of ethylene carbonate (EC) and propylene carbonate (PC) (1/1 by volume) in which LiTFSI (1 mol/L) was dissolved and vinylene carbonate (VC) (2% by weight) was finally added (30 s) and the excess of the electrolyte medium on the surface of the electrodes was then taken off. The membrane was then placed between the two electrodes in a coin cell. The discharge capacity values of the coin cell so obtained at different discharge rates are set forth in Table 1 here below.

TABLE 1

| Rate | | Average Discharge [mAh/g] | [%] |
|---|---|---|---|
| 0.05 | Discharge D/20 | 106.6 | 100 |
| 0.1 | Discharge D/10 | 105.3 | 99 |
| 0.2 | Discharge D/5 | 98.5 | 92 |
| 0.5 | Discharge D/2 | 84.5 | 79 |
| 1 | Discharge D | 58.9 | 55 |
| 2 | Discharge 2D | 22.8 | 21 |
| 0.05 | Discharge D/20 | 103.0 | 97 |

COMPARATIVE EXAMPLE 3

A polymer electrolyte membrane was manufactured according to Example 2 but without TSPI.

The membrane was dissolved in DMF.

EXAMPLE 10—MANUFACTURE OF A POLYMER ELECTROLYTE MEMBRANE

Example 10-A: Preparation of the Solution

The polymer (F-2) (3 g) was dissolved in 27 g of DMF at room temperature thereby providing a solution containing 10% by weight of the polymer (F-2). The solution was homogeneous and transparent after homogenization at room temperature. DBTDL (0.039 g) was then added. The solution was homogenized at room temperature for 15 min and TSPI (0.154 g) was added. The quantity of DBTDL was calculated to be 10% by moles vs. TSPI. TSPI itself was calculated to be 1.1% by moles vs. the polymer (F-2). The solution was stirred at room temperature for about 24 hours so as to let isocyanate functional groups of TSPI to react with the hydroxyl groups of the polymer (F-2).

In the next step, 3.19 g of the solution were mixed with 1 g of an electrolyte medium containing a 0.5 mol/L solution of LiTFSI in PYR13TFSI.

The quantity of the electrolyte medium was fixed to 1 g and the quantity of the polymer (F-2) was calculated accordingly.

The weight ratio [$m_{electrolyte}$ ($m_{electrolyte}+m_{polymer\ (F-2)}$] was set to 76% (i.e. 0.319 g of polymer (F-2)).

After homogenization at room temperature, TEOS was added. Once again, the solution was homogenized at room temperature for 10 min and formic acid was added. The solution was vigorously stirred for 30 sec. The quantity of TEOS was calculated from the weight ratio ($m_{SiO2}/m_{polymer\ (F-2)}$) assuming total conversion of TEOS into $SiO_2$. This ratio was 25%. Thus, the mass of TEOS was 0.29 g.

The quantity of formic acid was calculated from the following equation:

$$n_{formic\ acid}/n_{TEOS}=2.$$

Thus, the mass of formic acid was 0.13 g.

Example 10-B: Casting of the Solution

The solution was spread with a constant thickness onto a HALAR® 9414 film substrate using a tape casting machine (doctor blade). This casting step was repeated twice with fresh solutions so as to obtain a membrane based on three casting layers. The thickness of the casting was controlled by setting for the first two layers a distance of 40 μm and for the third layer a distance of 60 μm between the knife and the substrate. After each casting step, the membrane was left at room temperature for 2 hours and dried in the oven at 50° C. for 30 min.

The membrane had a constant thickness of about 30 μm.
No dissolution of the membrane in DMF was observed.

COMPARATIVE EXAMPLE 4

A polymer electrolyte membrane was manufactured according to Example 10 but without TSPI.

The membrane was dissolved in DMF.

The invention claimed is:

1. A polymer electrolyte membrane comprising at least one fluoropolymer hybrid organic/inorganic composite [polymer (F-h)] and an electrolyte medium comprising at least one metal salt [medium (E)], wherein polymer (F-h) includes fluoropolymer domains and inorganic domains and comprises at least one grafted fluoropolymer [polymer (F-g)] comprising recurring units derived from at least one fluorinated monomer [monomer (F)] and at least one hydrogenated monomer [monomer (HH)], said monomer (HH) comprising:

at least one pendant side chain comprising an end group of formula —O—C(O)—NH—Z-$AY_mX_{3-m}$ (M1-g), wherein m is an integer from 1 to 3, Y is a hydrolysable group, A is a metal selected from the group consisting of Si, Ti and Zr, X is a hydrocarbon group comprising at least one —N=C=O functional group and Z is a hydrocarbon group, optionally comprising at least one —N=C=O functional group, and optionally, at least one pendant side chain comprising an end group of formula —O-$A'Y'_{m'-1}X'_{4-m'}$ (M2-g), wherein m' is an integer from 1 to 4, Y' is a hydrolysable group, A' is a metal selected from the group consisting of Si, Ti and Zr, X' is a hydrocarbon group, optionally comprising at least one functional group different from the —N=C=O functional group, and wherein the inorganic domains are obtained by hydrolysing and/or condensing the end groups of formula —O—C(O)—NH—Z-$AY_mX_{3-m}$ (M1-g) and, optionally, the end groups of formula —O-$A'Y'_{m'-1}X'_{4-m'}$ (M2-g) of polymer (F-g).

2. An electrochemical device comprising the polymer electrolyte membrane according to claim 1.

3. The polymer electrolyte membrane according to claim 1, wherein the medium (E) comprises at least one metal salt and at least one organic carbonate.

4. The polymer electrolyte membrane according to claim 1, wherein the medium (E) comprises at least one metal salt, at least one ionic liquid and, optionally, at least one organic carbonate.

5. The polymer electrolyte membrane according to claim 1, wherein the metal salt is selected from the group consisting of MeI, Me(PF$_6$)$_n$, Me(BF$_4$)$_n$, Me(ClO$_4$)$_n$, Me(bis(oxalato)borate)$_n$("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(R$_F$SO$_2$)]$_n$ with R$_F$ being C$_2$F$_5$, C$_4$F$_9$, CF$_3$OCF$_2$CF$_2$, Me(AsF$_6$)$_n$, Me[C(CF$_3$SO$_2$)$_3$]$_n$, Me$_2$S$_n$, wherein Me is a metal and n is the valence of said metal.

6. The polymer electrolyte membrane according to claim 5, wherein Me is a transition metal, an alkaline metal or an alkaline-earth metal.

7. The polymer electrolyte membrane according to claim 6, wherein Me is selected from Li, Na, K, and Cs.

8. The polymer electrolyte membrane according to claim 1, wherein polymer (F-g) further comprises recurring units derived from at least one hydrogenated monomer [monomer (H)].

9. The polymer electrolyte membrane according to claim 1, wherein the at least one monomer (F) comprises vinylidene fluoride (VDF) optionally in combination with at least one monomer different from VDF.

10. The polymer electrolyte membrane according to claim 1, wherein the at least one monomer (F) comprises a combination of tetrafluoroethylene (TFE), chlorotrifluoroethylene (CTFE), and at least one monomer (H) selected from ethylene, propylene and isobutylene, optionally in combination with one or more additional monomers.

* * * * *